(12) United States Patent
Sambasivan et al.

(10) Patent No.: US 9,017,764 B2
(45) Date of Patent: *Apr. 28, 2015

(54) HIGH TEMPERATURE STABLE AMORPHOUS SILICA-RICH ALUMINOSILICATES

(71) Applicant: Applied Thin Films, Inc., Skokie, IL (US)

(72) Inventors: Sankar Sambasivan, Chicago, IL (US); Vikram Sharad Kaul, Atlanta, GA (US); Francis Richard Chapman, Mount Prospect, IL (US); Jeffrey William Donelan, Highland Park, IL (US)

(73) Assignee: Applied Thin Films, Inc., Skokie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,861

(22) Filed: Jul. 25, 2013

(65) Prior Publication Data

US 2014/0272167 A1    Sep. 18, 2014

Related U.S. Application Data

(60) Division of application No. 13/186,861, filed on Jul. 20, 2011, now Pat. No. 8,497,018, which is a continuation of application No. PCT/US2010/022173, filed on Jan. 27, 2010.

(60) Provisional application No. 61/206,139, filed on Jan. 28, 2009.

(51) Int. Cl.
*B05D 3/02*   (2006.01)
*C23C 4/10*   (2006.01)
*C01B 33/26*  (2006.01)
*C04B 37/00*  (2006.01)
*C04B 41/00*  (2006.01)
*C04B 41/50*  (2006.01)
*C04B 41/86*  (2006.01)
*B64G 1/58*   (2006.01)
*C04B 111/00* (2006.01)

(52) U.S. Cl.
CPC ........... *C23C 4/105* (2013.01); *C01B 33/26* (2013.01); *C04B 37/005* (2013.01); *C04B 41/009* (2013.01); *C04B 41/5022* (2013.01); *C04B 41/86* (2013.01); *C04B 2111/00982* (2013.01); *C04B 2237/10* (2013.01); *B64G 1/58* (2013.01)

(58) Field of Classification Search
USPC .................................................. 427/376.2
See application file for complete search history.

(56) References Cited

U.S. PATENT DOCUMENTS

| | | | |
|---|---|---|---|
| 5,350,447 A * | 9/1994 | Copes ............... | 106/287.17 |
| 6,352,790 B1 * | 3/2002 | Eaton et al. .......... | 428/689 |
| 8,497,018 B2 * | 7/2013 | Sambasivan et al. ..... | 428/336 |
| 2004/0011245 A1 * | 1/2004 | Sambasivan et al. ..... | 106/14.12 |
| 2004/0138058 A1 * | 7/2004 | Sambasivan et al. ..... | 502/208 |
| 2005/0142364 A1 * | 6/2005 | Aitken .............. | 428/426 |
| 2006/0057407 A1 * | 3/2006 | Sambasivan et al. ..... | 428/472.3 |
| 2009/0000518 A1 * | 1/2009 | Araya et al. ........... | 106/287.13 |

\* cited by examiner

*Primary Examiner* — Nathan Empie

(57) ABSTRACT

A solid amorphous silica-rich aluminosilicate composition is stable at temperatures up to 1500° C. or above and is capable of sustained use as a coating under high to extreme temperature conditions.

20 Claims, No Drawings

HIGH TEMPERATURE STABLE AMORPHOUS SILICA-RICH ALUMINOSILICATES

CROSS-REFERENCE TO RELATED APPLICATIONS

This application is a division of U.S. application Ser. 13/186,861 filed Jul. 20, 2011, now U.S. Pat. No. 8,497,018, which is a continuation of International Application No. PCT/US2010/022173, filed Jan. 27, 2010, which claims priority to U.S. Provisional Application No. 61/206,139 filed Jan. 28, 2009, all of which are incorporated by reference herein.

BACKGROUND OF THE INVENTION

This invention relates to amorphous aluminosilicates stable at high temperature and more particularly relates to amorphous silica-rich aluminosilicates useful as coatings suitable for use at high to extreme temperatures.

High performance, high temperature resistant materials are needed for applications that experience high to extreme temperature conditions normally in excess of 1000 or 1200° C. or above. Interest in Ultra-High Temperature Ceramic (UHTC) materials is rapidly emerging with diverse needs for protective coatings for temperatures ranging above 1500° C. In such environments, material degradation from corrosion, which may be accelerated by air, moisture, salt, or other contaminants, poses a serious problem in advanced materials used and being designed for air and space vehicles and other high performance applications. Ceramic refractory materials are used in extreme environments such as in glass making, metal production, and others uses which are prone to degradation from sintering (porosity goes down and so does the toughness) or environmental attack. In both cases, if a coating acts as a good barrier against sintering or gases that diffuse from external atmospheres, the life of the refractory may be extended significantly and this could save high costs for replacement and/or repair. High temperature resistant coatings also would be useful in protecting an article made from a suitable substrate such as a ceramic used in such applications. In addition, such materials may have engineered porosity (open and/or closed), which is useful in maintaining targeted performance in end-use applications. Typically, residual porosity in a bulk material is tailored for imparting lower weight while maintaining or improving toughness of an article. A beneficial coating system would not significantly decrease or degrade the engineered porosity (and thereby degrade performance characteristics based on such porosity) while protecting a substrate from corrosion/oxidation or other degradation under high temperature conditions such as in excess of 1500° C.

SUMMARY OF THE INVENTION

A solid amorphous silica-rich aluminosilicate composition is stable at temperatures up to 1500° C. or above and is capable of sustained use as a coating and a protective barrier material under high to extreme temperature conditions.

DESCRIPTION OF THE INVENTION

Amorphous silica-rich aluminosilicates of this invention are stable at extreme temperatures of above 1450° C., above 1500° C., above 1550° C., or above 1600° C. or above. These aluminosilicates are useful as protective coatings on substrates typically formed into useful articles, which are subject to extreme operating conditions such as experienced in aero or rocket engines. A protective coating typically is incorporated onto such substrate as protection against oxidative degradation of the substrate during operating conditions.

An amorphous aluminosilicate material of this invention when applied and treated as a coating to a suitable substrate forms a thin, highly conformal film bonded onto the substrate with sufficient density and low through-thickness transport properties to enable the coating to serve as a highly effective surface sealant and environmental barrier for the underlying substrate. The nature of the 'glassy' amorphous aluminosilicate material of this invention renders it highly stable in extremely hot environments, and typically is stable and effective as an environmental barrier at temperatures of 1000° C. to 2000° C.

Substrates useful in this invention are capable of withstanding a temperature in excess of 1500° C. without melting or destruction for a time sufficient to form a coating of this invention. Typically, such suitable substrates are ceramic materials, although high melting metallic materials may be useful. Ceramics are materials having a glazed or unglazed body of crystalline or partly crystalline structure, or of glass, which body is produced from essentially inorganic, non-metallic substances and either is formed from a molten mass which solidifies on cooling, or is formed and simultaneously or subsequently matured by the action of the heat. Ceramics may be metal oxides such as oxides of aluminum (alumina) or zirconium (zirconia) or yttrium (yttria) or combinations thereof and non-oxides such as borides, nitrides, carbides, and silicides. Typical ceramics include refractory oxides, silicon carbide, titanium carbide, silicon carbide in carbon or silicon carbide fiber composites, and carbon-carbon fiber composites Suitable substrate materials which are used in extreme temperatures are those which are mechanically strong and stable, preferably lightweight, and durable at elevated temperatures. These materials include silicon carbide, silicon nitride, carbon, and composites made from these components, and other nitride, carbide, and oxide-based materials, which have good thermal properties and low weight. Typically, these materials when uncoated are not stable against prolonged contact with environments such as oxygen and/or water vapor at extreme operating temperatures. Examples of useful applications of coating materials of this invention include protection of turbine engine components which may be formed from SiC—SiC composites, particularly for materials known as MI SiC composites, and protection of carbon-to-carbon (C—C), C—SiC, SiC—SiC and other materials used in rocket propulsion and thermal protection systems for space and air vehicles, and hypersonic vehicles. The coatings used for environmental protection on these substrate materials according to this invention permit operations under conditions, which are not otherwise possible or degrade very rapidly such that adequate service life is not feasible. Further, coatings of this invention are useful to extend operating lifetimes of current generation high temperature ceramic carbide, nitride, and oxide materials.

Amorphous aluminosilicate materials of this invention typically may be used for coatings on substrates prone to high temperature oxidation, sintering (such as relevant to refractories), or water vapor degradation, such as refractories, silicon carbide, silicon nitride, or carbon, and various composite materials containing such materials, and include other oxide and metallic constituents, such as zirconium nitride or boron nitride in the form of surface hard coatings, as well as thermal barrier coating (TBC) materials such as stabilized zirconia, barium strontium aluminosilicates, and other thermal or combined thermal and environmental barrier coating (EBC) materials. Amorphous aluminosilicate-based coatings of this invention serve to add both performance and lifetime to systems to which they are applied as add-on materials, or such coatings may serve to determine new engine design and performance criteria.

Amorphous aluminosilicates of this invention may be used as an environmental barrier coating on heat engine components to increase lifetime, efficiency, and thermal performance. Such heat engines include devices which transform heat energy into useful work, and include brayton cycle turbine engines, rocket engines, Carnot engines, rankine engines, and the like.

An aspect of this invention is a coating capable of protecting an attached substrate against oxidative degradation at operating temperature in excess of 1450° C., preferably above 1500° C., and more preferably above 1550° C. or 1600° C. Such coating material is characterized as a silica-rich substantially amorphous aluminosilicate. Typically, the Si/Al ratio of such aluminosilicate is greater than 4. Amorphous character of aluminosilicates useful in this invention is determined by X-ray diffraction (XRD) spectra. A substantially amorphous material does not exhibit specific or sharp XRD peaks, which can be attributed to lattice parameters of a crystalline structure. These materials also may be described as a glass.

An aluminosilicate composition of this invention is amorphous and remains substantially amorphous during extreme temperature operating conditions such as at temperatures of 1500° C. and above, and thus is stable at such temperatures. Thus, a coating formed from such amorphous aluminosilicate is stable (i.e. remains amorphous) and continues to act as an effective oxidative degradation barrier at such extreme conditions.

Conventional aluminosilicate materials formed by combining aluminum and silicon oxides or sources thereof, which when heated to above 1400° C. or above 1500° C. transform into known crystalline phases depending upon parameters such as composition, temperature, and pressure. For example, a conventional aluminosilicate composition having a Si/Al atomic ratio of 3 heated to 1500° C. will convert to a mixture of crystalline phases, including mullite and silica crystalline polymorphs (such as tridyamite or cristobalite), which are not microstructurally stable and will not function as a suitable diffusion barrier coating upon ceramic or metal substrates as an effective environmental barrier coating. Silica-rich aluminosilicates of this invention are microstructurally stable at extreme temperatures such as at 1500° C. as well as being capable of retaining barrier properties for extended time periods at elevated temperatures such as above 1000° C., 1200° C., 1500° C., or above. At these elevated temperatures silica-rich aluminosilicates are not transformed to crystalline forms and retain barrier properties.

Silica-rich aluminosilicates of this invention typically have Si/Al atomic ratios above 4, preferably above 5, more preferably above 6, and may be above 7. Typical Si/Al ratios of aluminosilicates useful in this invention may range up to 15 or above and preferably range up to 12. Typical Si/Al ratios include 5-15, 6-10, 7-9, and 8-12.

Because the amorphous aluminosilicate compositions of this invention typically are prepared from precursor solutions containing phosphorus, which is partially eliminated during a thermal treatment curing process, these compositions may contain residual amounts of phosphorus. Phosphorus content in typical aluminosilicate compositions of this invention range up to 8 mole percent of the total composition. Typical phosphorus content is 0.1 to 4 mole percent.

Additional elemental components may be present the compositions of this invention such as zirconium or rare earth or alkali or alkaline earth metals (usually in the form of oxides) which impart enhanced thermal durability or chemical compatibility with substrates. Typical concentrations of such other components range up to 5 mole percent of the total composition.

Many substrates useful as high performance materials have open-cell porosity, which can be measured as average pore volume. Because such porosity is important to the usefulness of such high performance materials (such as heat barriers), a coating that functions to protect the substrate against oxidative degradation, should not significantly affect the porous character of the substrate. Preferably there is less than 10 wt. % (preferably less than 2 wt. % and may be below 1 wt. %) change in pore volume after application of a coating of this invention. Thus, a superior coating is thin (typically less than 10 microns, preferably less than 5 microns, more preferably less than 1 micron) and is able to coat surfaces within pores of a substrate and protect all surfaces of a porous material against oxidative degradation at extreme operating conditions experienced by such substrate including temperature and moisture and contaminant concentrations.

Typical coating thicknesses may range from 0.1 µm (100 nm) to over 2000 µm (2 mm). The aluminosilicate based coatings used in this manner provide protection from ambient oxygen and water vapor ingress to the underlying component, as well as sintering resistance, protecting from oxidation and chemical attack of the substrate and/or maintaining engineered porosity, allowing higher sustained service temperatures at constant lifetime, or constant service temperatures for longer performance lifetimes, or enabling the use of new generation materials that can be protected in aggressive high temperature environments, which are typified by the existence of temperatures above 1400° C. or above 1500° C.

Solid-state oxide powders mixed in ratios similar to those produced in coatings of this invention and heated to 1500° C. should not form a glassy amorphous aluminosilicate phase as demonstrated in this invention. A coating applied to a substrate and formed using a precursor solution according to this invention does show melting and glassification as described in this invention.

The coating material of this invention conveniently may be prepared by heating a mixture of sources of alumina, silica, and phosphorus oxide under suitable conditions to a temperature at which the material melts and phosphorus-containing compounds substantially are eliminated as a vapor, which leaves a silica-rich aluminosilicate. Some residual phosphorus may remain after the material solidifies (typically less than 1 wt. %), which typically is incorporated into the silicate network. As the phosphorus content of the material decreases, the eutectic temperature at which the remaining aluminosilicate melts increases. The result is that the remaining amorphous aluminosilicate solidifies without a change in temperature and typically retains its solid form when subsequently taken to temperatures above 1550° C. Thus, an aluminum-, silicon-, phosphorus-containing starting composition on a substrate is melted at a temperature typically in excess of 1450° C. (preferably 1500° C. and a solid coating is formed on the substrate, which coating remains solid and functions as an effective oxidation barrier coating at temperatures in excess of 1500° C.

Amorphous aluminosilicate compositions of this invention may be made by forming a liquid-containing polymeric network (such as a sol-gel) containing oxidic species of aluminum and phosphorus to which silicon-containing components are incorporated, which is cured by heating to a temperature sufficient to melt and then to form a glass material. Sol-gel materials typically are formed in an aqueous or preferably a non-aqueous media such as an alcohol (typically a $C_1$-$C_8$ alcohol or mixtures thereof and preferably ethanol). In a typical procedure, solutions of an aluminum salt (such as aluminum nitrate) and a phosphorus oxide such as phosphorus pentoxide ($P_2O_5$) are combined in the presence of a silicon dioxide (silica) or source thereof. Although a silicon-containing source may be in a substrate (such as silicon carbide), from which silica is produced during formation of a coating, preferably additional silicon-containing material is incorporated into the aluminum-phosphorus-oxygen sol-gel, such as tetraethylorthosilicate (TEOS, $Si(OC_2H_5)_4$). It is believed that AlO(4)-O—AlO(6) (i.e. two aluminums coordinated via oxygen-linked tetrahedral and octahedral complexes) may result in a glass network which provides the demonstrated amorphous character at extreme temperatures.

The aluminum to phosphorous molar ratio in a precursor material may be more than 0.5, and typically is below 1.5 and preferably is below 2.5.

In another aspect of this invention, the source of silica may be a layer of silica deposited on a substrate such as a ceramic or metal on which a layer of aluminum-containing and phosphorous-containing material (such as a sol-gel). During formation of a coating or composition of this invention, silica may be incorporated into the sol-gel precursor from which the high silica aluminosilicate is formed.

In accordance with this invention, amorphous aluminosilicate-based material environmental barrier coatings may be applied through precursor solution routes, such as brush or spray painting, flowing the precursor solution onto the surface to be coated, using a dip coating process, thermally spraying, infiltration processing, or vapor deposition to various substrate articles. As an alternative method of application, the precursor solution contained in the above-mentioned admixtures can be dried to a gel powder, which subsequently can be applied as a slurry layer by painting, dipping, or spraying. Examples of articles on which coatings of this invention may be applied include thermal protection systems used in airframes for space and air transportation, hot exhaust structures in turbine or rocket propulsion systems, turbine engine blades, vanes, shrouds, or combustion housing, and other high temperature components such as cowls, thruster cones and plugs, and the like, rocket thrust chamber components, or combustion engine piston heads and walls. Degradation of components in steel, glass making, and advanced alloy manufacturing (such as nickel based superalloys) is well known due to extreme processing temperatures and use of this invention would extend part lifetimes in such manufacturing operations to yield improved productivity and reduced costs.

In an aspect of this invention, porous refractories are used in metal production, such as in steel plants, in which temperatures above 1300-1500° C. are used. In refractory uses in which silica already is present contacting such silica with an aluminophosphate solution formulation may produce a silica-rich aluminosilicate material as described in this invention.

Without being bound by a theory, it is believed that a polymeric network (e.g. a sol-gel) initial composition containing Si—Al—O—P structures melts at 1500° C. or above, while phosphorus compounds are substantially eliminated as vapors. With loss of phosphorus, the melting temperature of the remaining aluminosilicate increases and such aluminosilicate solidifies into an amorphous solid state.

In a method of this invention, a liquid-containing glassy network such as a sol-gel composition containing oxides of aluminum, phosphorus, and silicon is dried to form a dried precursor typically at elevated temperature (usually 100 to 200° C.) or reduced pressure to remove volatile organics, and then cured by heating to at least the melting temperature of the resulting mixture for a time sufficient to form a flowable fluid. Such fluid state may form a film or layer on a substrate having a substantially uniform (typically <10% variation) composition throughout the layer with excellent conformality to yield a smooth surface layer. As the resulting melt layer soldifies after loss of phosphorus compounds, a relatively smooth layer is obtained which may also provide beneficial low friction and aerodynamic flow properties. Typical curing temperatures useful in this invention are above 1450° C., preferably 1500° C. or above, and may range up to above 1600° C. A typical range of curing temperatures is between 1475 and 1650° C., and typically is 1500 to 1600° C. A suitable curing temperature is below the disintegration temperature of the materials. A suitable curing time is about one hour and typically may range up to 3 hours or more. Drying and curing may be conducted in one continuous step.

In an alternative aspect of this invention, an amorphous aluminosilicate coating may be applied to a substrate by surface heating a layer formed from a dried precursor containing oxides of aluminum, phosphorus, and silicon. In this aspect, the surface layer is heated to a suitable curing temperature without excess heating of the substrate, thereby permitting substrates with relatively low thermal stability. For example, metal substrates, such as steel or titanium or superalloy or other nickel-based alloys may not be stable under processing conditions required to form the aluminosilicate material as prescribed above. Non-metallic substrates may be used such as plastic materials. An example of a surface heating technique is laser heating. Due to the diffusion barrier properties of the aluminosilicate material, excellent protection of metallic substrates over long term can be imparted in harsh service environments over a wide range of temperatures (typically below 1200° C.).

Amorphous aluminosilicate compositions and coatings formed from such compositions are stable at a temperature of 1500° C. That is, the aluminosilicate material does not transform to a crystalline form such as mullite (or related compositions within the alumina-silica two-phase composition system) at that temperature. Suitably stable coating materials of this invention do not spall or flake from an adhered substrate at operating temperature of 1500° C. Further, coating materials of this invention act as a hermetic barrier to oxygen and resists oxidative corrosion of the substrate. Preferable solid coating materials of this invention are suitably stable under extreme conditions of temperature (>1500° C., preferably >1600° C.) together with presence of moisture and contaminants such as salt.

Minor amounts of additional materials (typically less than 10 mol %) may be incorporated into the amorphous aluminosilicate compositions and coatings of this invention. These materials may be considered as dopants and include metals such as sodium, zirconium, lanthanum, and the like (typically in the form of oxides). Such dopants can be utilized to tailor the melting temperature and to suit specific substrate properties.

An aspect of this invention is used as a health monitoring coating on heat engine components to increase the overall system performance, efficiency, and reliability. An amorphous aluminosilicate material of this invention can be applied to heat engine component, with the primary application method targeted at infiltration of the coating material into the internal porous surfaces of high temperature exposed substrate materials. This material may be formulated with a small amount of a doping agent that is detectable through non-destructive methods, and also has a characteristic that changes as a function of exposure time to temperatures typically above 1400° C. Doping agents used in this manner are readily recognized by those skilled in the state of the art, and are typically diffusion based indicators with time at elevated temperature, such that the concentration gradient as a function of dopant location, in this case, typically depth within the heat engine porous substrate structure, can be conveniently used to determine the thermal aging processes that are occurring in real time to the heat engine substrate and overall component. Dopants that display characteristics of this nature are typically highly mobile metallic ions, which are generally located in the transition metal series, and historically include chromium (Cr), europium (Eu), erbium (Er), cerium (Ce), and neodymium (Nd). An additional advantage of cerium, europium, and neodymium is the florescent properties which they possess, enabling easier concentration gradient detection using non-destructive methods. By adding small amounts of these dopant elements (typically in the form of ions) to the precursor solution of the amorphous silica-rich aluminosilicate material in accordance with this invention, these dopant elements may be incorporated into coatings on a substrate such as an engine part. Preferably, such coatings are applied through an infiltration process. The coatings containing a dopant element may be used to monitor the thermal aging profile ("health profile") of a coated engine component, which may be used to schedule preventative maintenance, avoid premature part replacement, and the like to increase engine performance, reliability, and efficiency.

In another aspect of this invention, suitable substrates may be joined together using silica-rich, amorphous aluminosilicate described in this invention as an intermediate adhesion layer between such substrates. In this aspect, precursor solutions may be applied to one or more surfaces of the substrates, such surfaces placed together, and the resulting combination cured at temperatures and pressures, which permit melting of the aluminum-silicon-phosphorus-containing material to form an intermediate silica-rich, amorphous aluminosilicate layer bonded to both surfaces.

In another aspect of this invention, an aluminum-silicon-phosphorus precursor solution of this invention may be applied to a suitable substrate and dried, but not cured. Such a coated substrate may be incorporated into a component, which may be subject to high temperature conditions. If such conditions become higher than the melting temperature of the uncured coating, the coating will be transformed into a silica-rich, amorphous aluminosilicate as described in this invention, and will become a protective barrier coating to the substrate.

Aspects of the invention are illustrated but not limited by the following examples.

EXAMPLE 1

An aluminosilicate glass material was formed on bulk silicon carbide (SiC) coupons. A low viscosity sol-gel precursor solution was prepared by adding 37.51 grams of aluminum nitrate nonahydrate to 250 milliliters of ethanol. In a separate container, 3.55 grams of phosphorus pentoxide were dissolved in 250 milliliters of ethanol. The two solutions were mixed and 11.2 milliliters of 98% tetraethyl orthosilicate were added with further mixing, and the solution then was stirred under reflux for 3 hours. After the substrate coupon was immersed in the precursor solution for one minute, the SiC substrate was removed from the solution with a controlled retraction velocity of 1 cm/second and resulted in a wet film on the surface of the SiC substrate. The film was dried and then cured in air in an oven by ramping the temperature at 10° C./minute to 1500° C., holding at 1500° C. for 1 hour, and then cooled to room temperature at 10° C./minute. The result was an approximately two micrometer thick film of primarily aluminosilicate glass formed having a Si/Al ratio of 5 and containing 1 wt % phosphorus.

EXAMPLE 2

An aluminosilicate glass material formed on SiC using a low viscosity sol-gel precursor solution was prepared according to Example 1. The aluminosilicate glass was formed by placing about 2 milliliters of the precursor solution onto a SiC substrate coupon. While the solution was still wet, the substrate was spun at 7000 rpm for 10 seconds, creating a thin wet film which was dried at 120° C. for 5 minutes. The film was then treated under ambient conditions in air using the procedure described in Example 1. The result was a approximately two micrometers thick film of aluminosilicate glassy material on the silicon carbide substrate.

EXAMPLE 3

Aluminosilicate glass material was formed on alumina (99.5% pure $Al_2O_3$ having a density of 3.9 g/cc) using a precursor solution. The precursor solution was prepared by adding 37.51 grams of aluminum nitrate nonahydrate to 166 milliliters of ethanol. In a separate container, 3.55 grams of phosphorus pentoxide was dissolved in 164 milliliters of ethanol. The two solutions were mixed and 169.2 milliliters of 98% tetraethyl orthosilicate was added with further mixing. The solution then was stirred overnight for about 16 hours. The precursor solution was applied to an alumina substrate by immersing the substrate in the solution for one minute and removing the sample with a controlled retraction velocity of 1.5 cm/second. Following removal from the precursor solution, the sample and resulting wet film were dried 120° C. for 10 minutes. The dipping and drying procedure was repeated three times on each sample. Following the dipping/drying steps, the sample was cured in air by ramping at 10° C./minute to 1500° C., held at that temperature for one hour, and then cooled to room temperature at 10° C./minute. The result was a glassy aluminosilicate materia on the surface of the $Al_2O_3$ substrate.

EXAMPLE 4

A precursor solution was prepared by adding 34.51 grams of aluminum nitrate nonahydrate to 173 milliliters of ethanol. In a separate container, 6.55 grams of phosphorus pentoxide was dissolved in 174 milliliters of ethanol. The two solutions were mixed and 152.7 milliliters of 98% tetraethyl orthosilicate was added with further mixing. The solution was then stirred overnight, about 16 hours. The precursor solution was applied to an alumina substrate by dipping/submerging the substrate in the solution for one minute and removing the sample with a controlled retraction velocity of 1.5 cm/second. Following removal from the precursor solution, the sample and resulting wet film were dried 120° C. for 10 minutes. The dipping and drying procedure was repeated three times on each sample. Following the dipping/drying steps, the sample was cured in air by ramping at 10° C./minute to 1500° C. where it was held for one hour and then cooled to room temperature at 10° C./minute. The result was a glassy aluminosilicate material on the surface of the $Al_2O_3$ substrate.

EXAMPLE 5

A precursor solution was prepared by adding 36.30 grams of aluminum nitrate nonahydrate to 170 milliliters of ethanol.

In a separate container, 18.31 grams of phosphorus pentoxide was dissolved in 170 milliliters of ethanol. The two solutions were mixed and a colloid formed within a few minutes of initial mixing resulting in a hazy solution. 160.1 milliliters of 98% tetraethyl orthosilicate was then added with further mixing. After one hour of stirring, the solution returned to clear and white precipitate was present. The solution was then stirred overnight for about 16 hours. The precursor solution was applied to an alumina substrate by dipping/submerging the substrate in the solution for one minute and removing the sample with a controlled retraction velocity of 1.5 cm/second. Following removal from the precursor solution, the sample and resulting wet film were dried 120° C. for 10 minutes. The dipping and drying procedure was repeated three times on each sample. Following the dipping/drying steps, the sample was cured in air by ramping at 10° C./minute to 1500° C. where it was held for one hour and then cooled to room temperature at 10° C./minute. The result was a glassy aluminosilicate material on the surface of the $Al_2O_3$ substrate.

EXAMPLE 6

A precursor solution was prepared by adding 37.51 grams of aluminum nitrate nonahydrate to 170 milliliters of ethanol. In a separate container, 9.46 grams of phosphorus pentoxide was dissolved in 170 milliliters of ethanol. The two solutions were mixed and 160.0 milliliters of 98% tetraethyl orthosilicate was added with further mixing. The solution was then stirred overnight, about 16 hours. The precursor solution was applied to an alumina substrate by dipping/submerging the substrate in the solution for one minute and removing the sample with a controlled retraction velocity of 1.5 cm/second. Following removal from the precursor solution, the sample and resulting wet film were dried 120° C. for 10 minutes. The dipping and drying procedure was repeated three times on each sample. Following the dipping/drying steps, the sample was cured in air by ramping at 10° C./minute to 1500° C. where it was held for 1 hour and then cooled to room temperature at 10° C./minute. The result was a glassy aluminosilicate material on the surface of the $Al_2O_3$ substrate.

EXAMPLE 7

In this example, the inventive aluminosilicate glass material was also formed as a bulk powder. A precursor solution was prepared by adding 36.30 grams of aluminum nitrate nonahydrate to 170 milliliters of ethanol. In a separate container, 18.31 grams of phosphorus pentoxide was dissolved in 170 milliliters of ethanol. The two solutions were mixed and a colloid formed within a few minutes of initial mixing resulting in a hazy solution. 160.1 milliliters of 98% tetraethyl orthosilicate was then added with further mixing. After one hour of stirring the solution returned to clear and white precipitated was present. The solution was then stirred overnight, about 16 hours. Approximately 15 milliliters of the solution was then dried at 120° C. for 16 hours to form a gel powder. This gel powder was placed on a zirconia-containing substrate and cured in air by ramping at 10° C./minute to 1500° C. where it was held for one hour and then cooled to room temperature at 10° C./minute. The result was a transparent and glassy powder of aluminosilicate material.

EXAMPLE 8

A solution was prepared by adding 37.51 grams of aluminum nitrate nonahydrate to 170 milliliters of ethanol. In a separate container, 9.46 grams of phosphorus pentoxide was dissolved in 170 milliliters of ethanol. The two solutions were mixed and 160.0 milliliters of 98% tetraethyl orthosilicate was added with further mixing. The solution was then stirred overnight, about 16 hours. Approximately 2 milliliters of the precursor solution was then placed on a zirconia-containing substrate using a dropper. The wet solution was cured in air by ramping at 10° C./minute to 1500° C. where it was held for one hour and then cooled to room temperature at 10° C./minute. The result was the formation of aluminosilicate glassy material on the $ZrO_2$ substrate.

EXAMPLE 9

The oxidation protection provided by the aluminosilicate glassy material described in this invention as a coating on SiC was determined based on oxide scale thickness. A coating of the inventive aluminosilicate glass was formed on SiC as described in Example 1. An aluminosilicate glass coated SiC substrate and an uncoated SiC substrate alongside each other were both heated in air to 1500° C. at a ramp rate of 10° C./minute. The samples were held at 1500° C. for 42.5 hours and then cooled to room temperature at 10° C./minute. The samples were mounted in epoxy in cross-section and polished to a finish of 0.1 microns. Scanning electron microscopy was used to determine the thickness of the oxide scales that formed on the coated and uncoated samples. These scales were measured to be 7 microns and 70 micron for the coated and uncoated samples, respectively indicating a 10-fold improvement in oxidation resistance of SiC as a result of the presence of the inventive aluminosilicate glass coating material.

EXAMPLE 10

The effect of the aluminosilicate glassy coating material of this invention on surface roughness of a substrate to which it is applied was examined. An aluminosilicate glass coating of an amorphous aluminosilicate material was formed on a SiC coupon substrate as described in example 1. The root mean squared (RMS) surface roughness value of the coated SiC coupon, alongside an otherwise identical uncoated SiC substrate, were measured by atomic force microscopy (AFM) to be 2.7 nanometers and 1 micron, respectively. This indicates almost an order of magnitude improvement in the surface roughness due to application of the aluminosilicate glassy material coating.

What is claimed is:

1. A method for producing a stable, silica-rich aluminosilicate amorphous coating material on a substrate comprising heating a mixture primarily comprising oxidic species of aluminum and phosphorous which are derived from a sol-gel and a silicon-containing compound to a temperature at which the mixture melts and thereafter the phosphorous containing species is substantially eliminated as a vapor and thereafter the remaining coating material is a stable solid at said temperature.

2. A method according to claim 1 wherein said heating is performed in separate stages of drying and subsequently curing and wherein the curing occurs after the mixture is dried and the dried mixture is subject to temperature conditions higher than that of drying.

3. A method according to claim 1 wherein said substrate has open-cell porosity with the pores having internal surfaces and said aluminosilicate amorphous coating material is formed on said internal pore surfaces.

4. A method according to claim 1 wherein said substrate is ceramic or metal and includes a silicon containing compound.

5. A method according to claim 1, wherein said substrate is selected from a group consisting of a composite containing silicon carbide based fiber or carbon based fiber.

6. A method according to claim 5 in which the composite contains a silicon carbide based matrix or carbon based matrix.

7. A method according to claim 1 in which said heating is performed through surface heating.

8. A method according to claim 1 wherein said aluminosilicate amorphous coating material contains less than 1 weight percent phosphorous.

9. A method according to claim 1 wherein said aluminosilicate amorphous coating material contains less than 4 mole percent of metals other than aluminum and silicon.

10. A method according to claim 1 in which said aluminosilicate amorphous coating material contains an alkali or alkaline earth metal oxide.

11. A method according to claim 1 wherein said substrate is a component in a heat engine.

12. A method according to claim 1 wherein said mixture is applied to the substrate and the method of application includes brushing, spraying, dip-coating, thermal spraying, infiltration, or vapor deposition.

13. A method according to claim 1 wherein said silicon-containing compound is silica.

14. A method according to claim 1, wherein said mixture contains dopants or elements to tailor the melting temperature.

15. A method according to claim 1, wherein said substrate is a ceramic refractory having open cell porosity and wherein said aluminosilicate amorphous coating material is formed on or within said open pores.

16. A method according to claim 1, wherein said substrate is a thermal or environmental barrier coating having open cell porosity and said aluminosilicate amorphous coating material is formed on or within said open pores.

17. A method according to claim 1, wherein said aluminosilicate amorphous coating material is used in service as a diffusion barrier.

18. A method according to claim 1 wherein said silicon-containing compound is derived from a source other than the mixture of aluminum and phosphorous oxidic species.

19. A method according to claim 18 wherein said silicon-containing compound includes silicon carbide, silicon nitride, or silicon oxide.

20. A method according to claim 19 wherein said aluminosilicate amorphous coating material is formed by applying the mixture to the substrate by spray, brush, or flow followed by drying and curing to a temperature at which the mixture melts and thereafter the phosphorous species is substantially eliminated.

* * * * *